United States Patent
Sjöstrand et al.

(10) Patent No.: US 8,190,294 B2
(45) Date of Patent: May 29, 2012

(54) DETECTION OF CONDITION CHANGES IN AN INDUSTRIAL ROBOT SYSTEM

(75) Inventors: Niclas Sjöstrand, Västerås (SE); Ivan Lundberg, Västerås (SE); Johan Gunnar, Västerås (SE); Shiva Sander-Tavallaey, Saltsjöbaden (SE)

(73) Assignee: ABB Research Ltd., Zürich (CH)

( * ) Notice: Subject to any disclaimer, the term of this patent is extended or adjusted under 35 U.S.C. 154(b) by 1126 days.

(21) Appl. No.: 12/071,894

(22) Filed: Feb. 27, 2008

(65) Prior Publication Data

US 2009/0132085 A1 May 21, 2009

(30) Foreign Application Priority Data

Mar. 9, 2007 (EP) .................................... 07103870

(51) Int. Cl.
*G06F 19/00* (2011.01)

(52) U.S. Cl. .................................... 700/245; 74/490.05

(58) Field of Classification Search .................. 700/245, 700/247, 249; 74/490.01, 490.05–490.07; 901/15, 28; 318/568.18, 580, 584, 568.17, 318/590, 611, 626, 615, 632; 701/23

See application file for complete search history.

(56) References Cited

U.S. PATENT DOCUMENTS

| | | | |
|---|---|---|---|
| 3,882,305 A | 5/1975 | Johnstone | |
| 4,150,326 A | 4/1979 | Engelberger et al. | |
| 5,822,212 A | 10/1998 | Tanaka et al. | |
| 7,069,185 B1 | 6/2006 | Wilson et al. | |
| 7,443,124 B2 * | 10/2008 | Bischoff et al. | 318/568.17 |
| 2005/0278148 A1 | 12/2005 | Bader et al. | |
| 2006/0015211 A1 * | 1/2006 | Kolb et al. | 700/213 |

FOREIGN PATENT DOCUMENTS

WO  WO-2004/040465 A  5/2004

OTHER PUBLICATIONS

European Search Report—Jul. 20, 2007.

* cited by examiner

*Primary Examiner* — Dalena Tran
(74) *Attorney, Agent, or Firm* — Venable LLP; Eric J. Franklin

(57) ABSTRACT

A method and an apparatus for detecting condition changes in a robot system. The method includes logging a work cycle representative signal at a first and a second occasion, logging, synchronously with the logging of the work cycle representative signal, a reference signal associated with work cycles at the first and second occasions, selecting the reference signal from signals having the following characteristics: a signal influenced by the path performed by the robot, a signal calculated by the robot system, and a signal that is identical at both the occasions if a manipulator of the robot performs a movement along exactly the same path at the first and second occasions, synchronizing the representative signals utilizing the logged reference signals, and comparing the synchronized signals to determine if any condition changes have occurred between the first and second occasions.

15 Claims, 3 Drawing Sheets

DETECTION OF CONDITION CHANGES IN AN INDUSTRIAL ROBOT SYSTEM

CROSS-REFERENCE TO RELATED APPLICATIONS

This application claims priority to European patent application 07103870.7 filed 9 Mar. 2007.

TECHNICAL FIELD

The invention relates to a method for detection of condition changes of an industrial robot system.

BACKGROUND OF THE INVENTION

An industrial robot system comprises a manipulator and control equipment, whereby the manipulator with the assistance of the control equipment carries out arbitrary operations within a working range. Usually, such a manipulator comprises a plurality of links which support a wrist and a tool flange, on which a tool is arranged. In the majority of robot applications, a traditional six-axis manipulator is used, which exhibits sufficient movability to carry out a wide range of operations with mostly very high accuracy. The control equipment includes a path generator for generating a robot path. The path generator receives instructions from a control program and on basis thereof determines how the manipulator should move in order to be able to execute the movement instruction. For example, the path generator calculates motor torque references and position and velocity of the axes of the robot. The computed motor references are transmitted to one or more drive modules to drive the manipulator in accordance with the movement instructions.

Depending on more intense utilization of robots, shorter change-over time and reduced scrap-rate in automated tasks, maintenance of industrial robots should be enabled with minimum breakdown times.

Service maintenance is traditionally operated by a breakdown maintenance strategy, i.e. unscheduled maintenance where a plant item is run to failure, or by a time based maintenance strategy, i.e. scheduled maintenance stop intervals, where a plant item is maintained at periodic intervals. While the former has long down-time and hence can present risks of loss in production and induce high repair costs, the latter may lead to unnecessary maintenance or even induce failures.

Condition based maintenance has been increasingly used for reliable, cost-effective monitoring of selected working characteristics of plant items. By moving from reactive to predictive maintenance, an organization can expect to reduce inventory costs out of maintenance and repair operations with no negative impact on productivity or availability of the facility. A prediction of the reliability of a single piece of equipment on the plant floor can be the difference between a few minutes of preventive maintenance and hours of downtime.

An automatic and simple to use method for health condition indication of a robot manipulator is hence a key requisite for a minimum breakdown maintenance strategy.

There are today, fairly manual methods indicating "health condition" of a robot manipulator. This task is usually addressed to the skill of a service engineer to "hear" and "interpret" different "signals".

An actual movement of a manipulator of an industrial robot in production is not for certain the same from cycle to cycle of repeated cycles. The robot system interacts with its environment, e.g. via I/O ports. The manipulator can be instructed to wait for other machines to finish their work or wait for a specific signal. This means that not all parts of data sampled from signals related to manipulator movement cycles collected during production are directly comparable from one cycle to another cycle of the repeated cycles.

A problem to be solved by the present invention is to how to synchronize signals logged at two different work cycles of the robot in order to be able to perform condition change analyses in the cases where the robot movements are not identical during both cycles, so the collected data is not directly comparable for the whole cycle.

Repeatability analyses as a tool for monitoring the robot performance requires possibility of comparing motion data sampled at different occasions. This in turn requires a technique with help of which synchronization of such signals is possible. Traditionally, such a comparison is performed utilizing test cycles, especially designed for this purpose.

U.S. Pat. No. 4,150,326 discloses a method to compare stored positional data representations of the manipulator during an observed operational work cycle with actual positional data representations during subsequent work cycles. The positions are measured at predetermined time intervals during execution of instructions in an instruction list and it is detected when a position during a time interval differs from previous measurement at this time interval. Such a method could be used for synchronization of signals logged at two different work cycles of the robot. However, a disadvantage with using this method for synchronization is that it requires total knowledge of the instruction list, hence the method must be performed in the control system associated with the robot, or the instruction list must be available to a stand alone apparatus. Further, a change in the instruction list spoils the synchronization. In a robot system a change in one instruction will not only affect the movement when execution this instruction, but also the instructions next to it. This method is not capable of handling these situations. Further, any non deterministic instructions, e.g. instructions where the robot waits for an external condition, will spoils the synchronization.

US 2005/0278148 discloses a method for appraising wear of axis of a robot arm. The method does not include steps of synchronizing measurements from different occasions and can not in a direct matter compare or pick out differences between data collected at two different occasions. Only using measured signals, e.g. the torque, not reference signals, and using trying to synchronize data from different occasions has several disadvantages. One disadvantage with this method is that the synchronization does not work in case the robot has to stand still and wait for something in one cycle and not in the other cycle, i.e. in cases where the robot movements are not identical during both cycles. A further disadvantage with this method is that it uses measured signals. The measured signals include noise, which means that it is not possible to synchronize each sample of the measured signal. This leads to a bad accuracy of the synchronization.

U.S. Pat. No. 5,822,212 and U.S. Pat. No. 7,069,185 discloses a condition change analyses, which is performed by comparing logged work cycles using a clock signal as reference. However, the clock signal does not contain any information on the robot motion and cannot be used for synchronization of signals logged at two different work cycles of the robot in cases where the robot movements are not identical during both cycles.

SUMMARY OF THE INVENTION

An object of the present invention is to provide a solution to the above-mentioned problem, which alleviates the above-mentioned disadvantages.

The main issue of the invention is to compare synchronized motion data from complete work cycles at different occasions. The aim is to synchronize the data, such that a condition change analysis can be performed.

According to the one aspect of the present invention, this object is achieved with a method that includes logging a work cycle representative signal at a first and a second occasion, logging, synchronously with said logging of the work cycle representative signal, a reference signal associated with work cycles at said first and second occasions, selecting said reference signal from signals having the following characteristics: a signal calculated by the robot system, a signal influenced by the path performed by the robot, and a signal that is identical at both said occasions if a manipulator of the robot performs a movement along exactly the same path at the first and second occasions synchronizing said representative signals by means of said logged reference signals and comparing said synchronized signals to determine if any condition changes have occurred between said first and second occasions.

According to the invention, a signal calculated by the robot system and influenced by the path performed by the robot is used for carrying out the synchronization. Examples of suitable signals to be used are signals calculated by the path generator, such as motor torque references, and position and velocity of the axes of the robot. Alternatively, a signal calculated based on one or more signals calculated by the path generator can be used. An advantage with using any of those signals is that they are free from measurement noise and contains information on the path performed by the robot during the work cycle.

With the path of the robot is meant the position and velocity of the robot during the work cycle, or the position of the robot in relation to time past in the work cycle. Thus, the reference signals will differ in cases where the robot movements are not identical during both cycles. The reference signals will differ if the positions of the robot differ during the work cycle as well as if the times it takes for the robot to move along the path differ between the work cycle. Accordingly, the invention makes is possible to synchronize the representative signals in cases where the robot movements differs with regard to position, time, velocity, and acceleration during the work cycles.

A further advantage with the present invention is that the method can be used in any type of robot system. The only requirement is that it must be possible to retrieve the measured representative signal and the calculated reference signal.

The present invention discloses a method for detection of condition changes in a robot system based on a synchronization and comparison of work cycle data in robot systems. By use of said method, it is possible to handle all kind of work cycle data, both from specially designed test cycles and production work cycles. The objective of the method is to indicate changes in (i) mechanical properties in the robot system and (ii) external properties which influence the performance of the robot system. The indication of changes could, in an early stage and without interference with the production, help to recommend a maintenance stop or/and function as a guideline for more advanced measurement of the robot system's performance.

The idea presented in this invention addresses a method for automatic synchronization of signals of a production work cycle retrieved at different occasions. By use of this method minimum intrusions in production processes are caused. The proposed method is applicable for repeatability analysis on any type of repeated cycles, such as test cycles.

The detection of deviations is made by extracting different measures from the parts of, or the complete, synchronized representative signal or from the relative difference of parts of, or the complete, synchronized representative signal originating from different occasions and compare these values to predefined or calculated thresholds. This includes both analyses in the time domain and in the frequency domain. One of the simplest examples of measures is to calculate the RMS value of the synchronized representative signals at all logged occasions. A deviation can be indicated when, e.g. the difference in RMS value for the synchronized representative signal originating from the first occasion compared with the representative signal originating from the second occasion exceeds a predefined threshold. Other measures are, e.g. Crest factor, energy content in a specific frequency band or energy content in a specific part of the signal.

A base for synchronization of work cycle data reference signals from, e.g., a path generator can be used. Said reference signals are calculated signals used for controlling the motion of the manipulator of the robot system. The reference signals fulfills the following demands:

they are free from measurement noise, i.e. they are deterministic, they are identical if the manipulator of the robot performs a movement along exactly the same path, executing the exact same motion instructions. Any signal fulfilling these demands can act as the base of the synchronization. Hence, signals fulfilling these demands are incorporated in the concept herein referred to as reference signal.

A more traditional approach when synchronizing data is to use some kind of trigger signal. This could for example be a signal, which turns from a low to a high value, when the work cycle is initiated. This approach could be considered as an alternative to achieve the synchronization, but several factors make it less attractive. To start with, there is no easy way of creating such a trigger signal, at least not without putting demands on the programming of the robot system. There is, however, another important aspect, that has to be taken into account, namely that data in a production work cycle is likely not comparable. Typical work cycle includes: identical segments and segments depending on the environment. The problem is solved with the present invention, as it is possible to pick out comparable data from a specific work cycle at different occasions. The approach according to the invention further has the advantage that it can be used for more complex work cycles, which cannot be addressed with any traditional approach for synchronization of signals.

According to a further aspect of the invention, this object is achieved by a computer program product coded for performing the algorithm according to the method.

According to a further aspect of the invention, this object is achieved by an apparatus for detecting condition changes in a robot system.

Such an apparatus is configured to: receive and store logged data regarding a work cycle representative signal for the robot at a first and a second occasion, receive and store data regarding a reference signal associated with work cycles at said first and second occasions, the data being logged synchronously with said logging of the work cycle representative signal, wherein said reference signal is a signal calculated by the robot system and influenced by the path performed by the robot, and a signal that is identical at both said occasions if a manipulator of the robot performs a movement along exactly the same path at the first and second occasions, to synchronize said representative signals by means of said logged reference signals, and to compare said synchronized signals to determine if any condition changes have occurred between said first and second occasions.

Suitably, the method according to the invention is implemented on an external computer connected to the robot system so that the apparatus can receive logged representative and reference signals from the robot system. Alternatively, the method can be implemented in a robot controller of the robot system.

DESCRIPTION OF EMBODIMENTS

Below the invention will be explained in greater detail by a description of embodiments with reference to the accompanying drawings.

Primarily, an overview of an industrial robot system is presented to indicate examples of input signals assembled from different sensors distributed throughout the robot system, as well as calculators for providing the synchronization method according to the invention with selected signals.

Figure 1A:
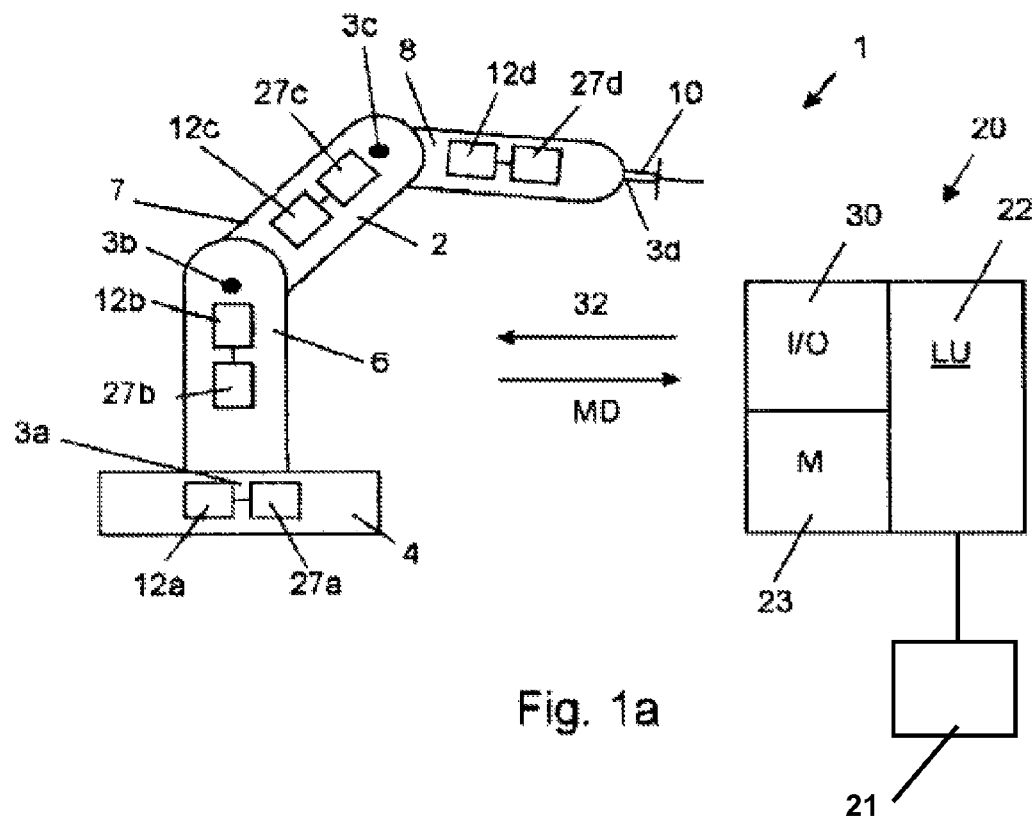
FIG. 1a shows an industrial robot comprising a manipulator and a control system adapted to control the robot.

FIG. 1a shows an example of an industrial robot system 1 comprising a manipulator 2 and a control system. It should be noted here, that in the vocabulary, the term "robot" is equal to the term "robot system". The industrial robot 1 has a plurality of links movable relative to each other about a plurality of joints 3a, 3b, 3c, 3d, in this case rotatable in relation to each other around an axis of rotation. The links are in this case robot parts, such as a stand 4, robot arms 6, 7, 8, and a wrist 10 comprising a turn disc. The industrial robot comprises a plurality of motors 12a, 12b, 12c and 12d controlling the position and speed of the links. The control system is illustrated as a simplified block diagram. The control system comprises, in this case, a controller 20 including one or more logic units 22, a memory unit 23 and drive units 27a, 27b, 27c, 27d for controlling the motors. The logic unit comprises a microprocessor, or processors comprising a central processing unit (CPU) or a field-programmable gate array (FPGA) or any semiconductor device containing programmable logic components. The controller is adapted to run a control program, stored in the memory unit 23. The controller is further adapted to generate a movement path based on movement instructions in the control program run by the logic units 22. The drive units 27a, 27b, 27c, 27d are controlling the motors by controlling the motor current and the motor position in response to control signals from the controller 20. The controller 20 comprises input/output interfaces, I/O, 30. On the robot and in the environment surrounding the robot is also arranged a plurality of sensors. The sensors on the manipulator 2 and in the environment of the manipulator 2 are connected to the I/O 30 of the controller 20 via a wired or wireless link 32. The controller 20 thereby receives signals comprising measured data MD. The measured data MD can be addressed to, either the controller, the manipulator, process application data, process quality data or external measurement devices. Controller 20 data can for example be ventilation fan speed, temperature, memory usage, battery, I/O and bus status etc. Process application data can for example be cycle time, current, flow and other measured process variables. Process quality data is variables measuring the robot operation result such as welding position accuracy, paint surface evaluation etc. External measurement devices can for example be vibration sensor such as an accelerometer, or a microphone, or an electromagnetic acoustic emission sensor, a gyroscope, a strain gauge, a global positioning system such as cameras or lasers etc. Manipulator data is for example motor angular position, speed and torque, motor and gearbox temperature, link angular, position and torque, such as feed forward torque. Other examples are cycle time, and energy consumption.

Figure 1B:
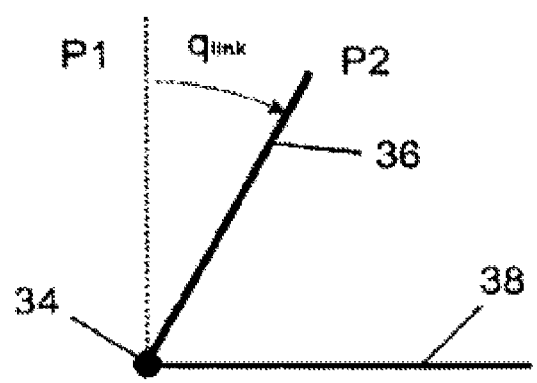
FIG. 1b shows two links movable relative to each other about a joint.

A model of the joints is established. FIG. 1b illustrates such an embodiment of a model of a joint 34, wherein the model comprises, in this case, two links 36, 38 movable relative to each other about the joint 34. The model relates to an industrial robot that has rotational axles, linear axles or a mixture of both.

In the robot model the robot joint 34 is connecting a first link 36 and a second link 38. The first link 36 is considered moving relative the second link 38. In the figure a movement of the first link 36 from a first position P1 to a second position P2 is illustrated, which corresponds to an angular position qlink. In order to get the angular position of the link, qlink, it is necessary to transform the data from the angular position, qm, of the motor controlling the link. The transmission from the motor to the link in this case, is characterized by a gear ratio and the moment of the rotational inertia of the link and motor. We therefore use the assumption that the angular position $q_{link}$ of the first link relative to the second link is considered corresponding to an angular position $q_m$ of the motor. In the examples below, the signal used for the synchronization purposes could be a feed forward torque calculated with the purpose to control the motor for moving the link 36 along a path from said first position to said second position. As stated previously, other signals could be used for the synchronization purposes.

In the present invention a work cycle is considered to be one full execution of a robot program, which controls the motion of the manipulator of the robot system. Typically, the robot program starts over at some point in the program, when the robot has completed a task and begins performing it over again. One execution of such a cycle is herein referred to as a work cycle. Production cycle is a work cycle the robot performs during normal production. A test cycle is a work cycle especially designed to excite some property of the robot system.

Further, in the present invention repeatability analysis is referred to as an analysis, wherein data from different occasions are compared to detect deviations.

Repeatability analyses of the robot's work cycle is interesting since it opens up a way to indicate condition changes in the manipulator. To be able to make any of these analyses, it must first of all be possible to collect signals from the controller 20. Further, it must be possible to pick out comparable batches of data, by use of these signals, and to synchronize these batches with each other, whereupon a study of a comparison of said synchronized batches of data collected at different occasions might differ and indicate deviations of any kind in the robot system 1.

In the logging process different signals from the robot system are retrieved to an external device 21, e.g. a PC. The logging is performed by a software application which communicates with the robot system via an interface. Several signals are logged simultaneously. Hence, all signals logged at the same occasion are synchronized. The signals are logged as data sets by means of a sampling of the logged signals with a proper sampling frequency.

Work cycle representative signals are retrieved from the controller 20. A logging of a representative signal for the purpose of the synchronization according to the present invention implies that the representative signal is measured, sampled with said proper sample frequency, and that the measured values are stored in a memory. A first logging of selected signals is performed at a first occasion and stored, as mentioned, in the memory. After a proper time, the same selected signals are logged at a second occasion and stored in the memory. Said second occasion can be at any time after the first occasion, e.g., some months, half a year, a year, or several years after the first occasion. The analysis is then performed by a comparison of the reference signals stored at the second occasion and the reference signals stored at the first occasion.

In a first case, a simple situation is presumed. A work cycle is repeated identically periodically. Data is collected and logged as indicated above for one axis at a time while the robot performs a simple work cycle. It turns out that in this first case a perfect match between the reference signals logged at the first and second occasion can be expected and verified, since the work cycles at the different occasions are truly identical. This means that the synchronization according to the invention can be performed without any influence of measurement noise.

Synchronization is achieved by use of the algorithm disclosed above by identifying substantially identical batches of reference signals retrieved during the two different occasions. In this first case, the efficiency of the algorithm can be improved by comparing shorter batches of data. The length of each batch must however be chosen, such that it does not repeat within the cycle investigated.

In a second case, work cycles may include varying time delays in an ordered movement along a path. Such events may occur if the robot is instructed to wait for another machine or another robot to finish some work process before it is instructed to continue its movement along the path. In such delayed movements, it is still possible to synchronize the signals to be compared from two different occasions according to the invention by use of the beginnings of the cycles, if no delay appears in a batch used for the synchronization.

In real production, it could be hard to find batches for synchronization. Apart from delays, it must be foreseen that the robot paths can be trimmed and slightly changed over a time period. This means that the approach of trying to synchronize all data in the stored data sets (batches) could become too optimistic. In a further embodiment of the invention, it is therefore developed a method, wherein only, e.g. one tenth of the cycles must be comparable in order to arrive at the desired result. In this embodiment, a search is performed to find the first batch of that length, that is common between the data sets. In this embodiment, wherein the work cycles are not fully identical a search of a perfect match between the batches is not useful. Instead slight differences between the reference signals should be accepted. To minimize the chance of acquiring incorrect synchronization, a search for the longest possible common batch from the different occasions is performed. If, for example, the batch lengths of the logged reference signals from the first and second occasions are 2 seconds and it is not possible to find matches between the logged signals, a shorter batch length is chosen from the batch of the second occasion and compared with the whole batch of the first occasion to find out if any part of the batches matches each other, such that the two reference signals can be synchronized. If this first shortened batch still does not match any part of the first logged reference signal the second batch is shortened further and the procedure is repeated. This goes on until a certain limited minimal length of the second batch is reached. If no match is found, one skips a batch of data and tries to find the next one. This goes on until a whole period of data in the reference work cycle has been covered.

Figure 2:
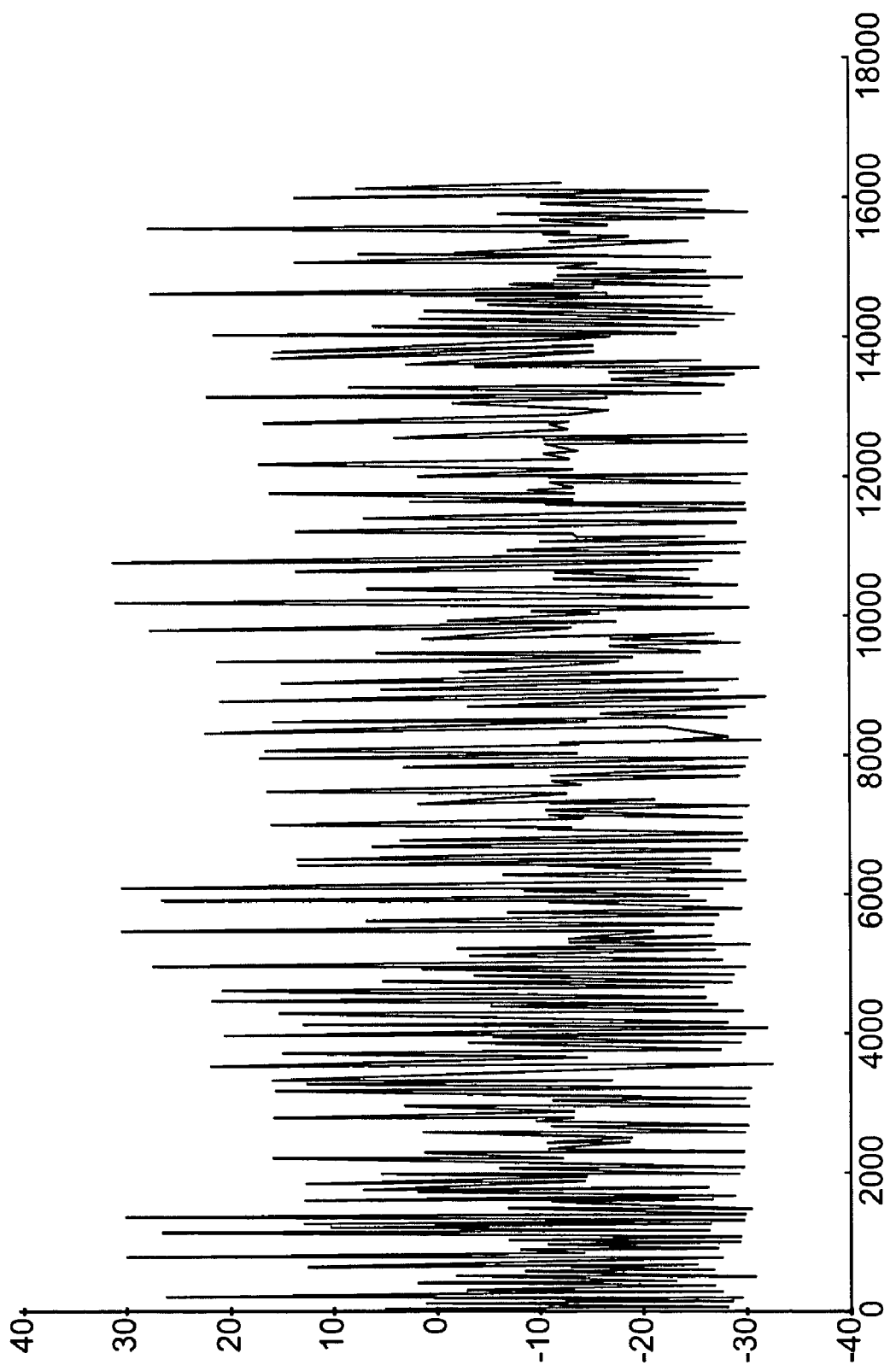
FIG. 2 shows unsynchronized motion signal data collected and memorized for one axle from a work cycle of a robot path with some typical variations merged from two different occasions.
Figure 3:
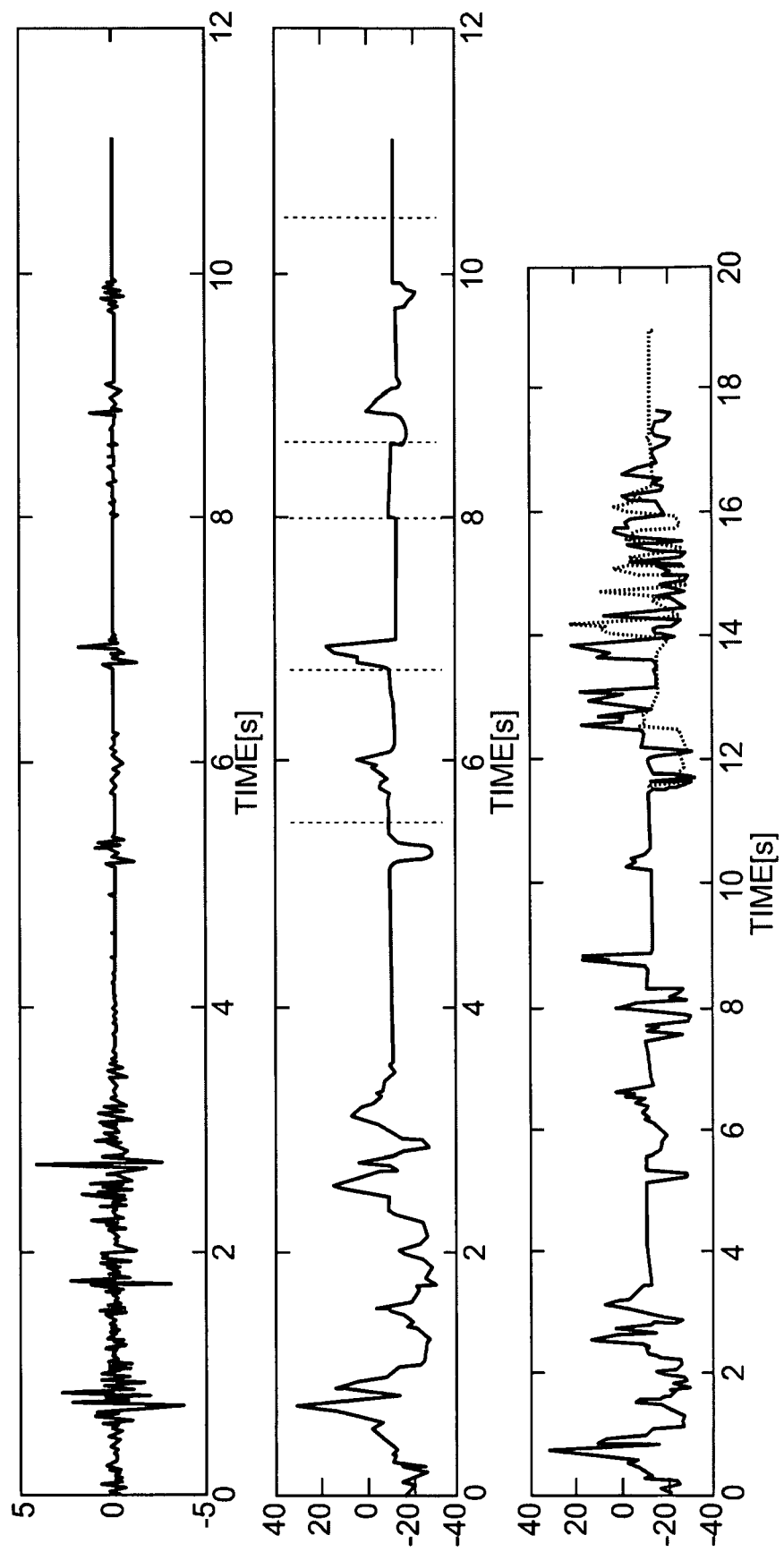
FIG. 3 illustrates the result of the method according to the invention applied to the unsynchronized sets of the data shown in FIG. 2.

The method according to the invention is illustrated with support of FIGS. 2 and 3. FIG. 2 shows unsynchronized feed forward torque data collected and memorized for one axle from a work cycle of a robot path with some typical variations merged from two different occasions.

FIG. 3 illustrates the result of the method according to the invention applied to the unsynchronized sets of the data shown in FIG. 2. In this, FIG. 3, it is shown how the method for extraction and synchronization of comparable data batches can be applied to get data appropriate for repeatability analyses and condition change indications.

The graph at the bottom of FIG. 3 shows how the signals (in this example, feed forward torque measured at an axle) from two different occasions at the first part of the cycle is synchronized in the left part of graph. The second graph from the bottom illustrates how other parts of the two signals are synchronized, where these synchronized parts of the signals from different parts of the work cycles are separated by vertical lines.

As the analyzed signal (the actual values of feed forward torque) from two different occasions now are available as synchronized, it is possible to check and analyze possible differences of the signals between the two occasions. The top graph of FIG. 3 illustrates the differences between the two synchronized signals shown in the second figure from the bottom. The scale of the top graph is enlarged four times, so that it will be easier to recognize differences that have come up between the analyzed signals recorded at the two different occasions.

Representative signal is herein defined as a signal sensed by a sensor detecting and registering a physical quantity of a movement performed by a part or a group of parts of the manipulator as a result of a control signal from the controller ordering said part or group of parts to perform said movement along a specific path in space or as a signal calculated from such a signal.

The invention claimed is:

1. A method for detecting condition changes in a robot system, the method being carried out in a processor, the method comprising:
    logging a signal representative of a work cycle of the robot system at a first and a second occasion,
    logging, synchronously with said representative signal representative of a work cycle of the robot system, a reference signal associated with work cycles at said first and second occasions,
    selecting said reference signal from:
    a signal calculated by the robot system,
    a signal influenced by a path performed by the robot system, and
    a signal that is identical at both said occasions if a manipulator of the robot system performs a movement along exactly a same path at the first and second occasions,
    synchronizing said representative signals utilizing said logged reference signals, and
    comparing said synchronized representative signals to determine if any condition changes in the robot system have occurred between said first and second occasions.

2. The method according to claim 1, further comprising:
generating a robot path, and said reference signal is a signal calculated by a path generator or based on one or more signals calculated by the path generator.

3. The method according to claim 1, further comprising:
performing said logging of said representative and said reference signals as a logging of data sets achieved by sampling of said signals, and
performing said logging of said signals during a predetermined time period.

4. The method according to claim 1, further comprising:
analyzing all logged data sets of said reference signal to find batches of the reference signal of at least a part of said time period being substantially identical in two or more data sets.

5. The method according to claim 4, further comprising:
synchronizing said representative signal in the data sets containing substantially identical batches of the reference signal by extracting corresponding found substantially identical batches of said reference signal.

6. The method according to claim 5, further comprising:
comparing said synchronized batches of the representative signal to detect any kind of deviations of the batches of the representative signal between the first and the second occasions.

7. The method according to claim 1, wherein said work cycle represents a cycle wherein a part or a group of parts of a manipulator of the robot system moves along a path from a position A to a position B.

8. The method according to claim 1, wherein said work cycle is a production work cycle or a test cycle.

9. A computer program product, comprising:
a computer readable medium; and
computer program instructions recorded on the computer readable medium and executable by a processor for carrying out a method for detecting condition changes in a robot system, the method comprising
logging a signal representative of a work cycle of the robot system at a first and a second occasion,
logging, synchronously with said representative signal representative of a work cycle of the robot system, a reference signal associated with work cycles at said first and second occasions,
selecting said reference signal from:
a signal calculated by the robot system,
a signal influenced by a path performed by the robot system, and
a signal that is identical at both said occasions if a manipulator of the robot system performs a movement along exactly a same path at the first and second occasions,
synchronizing said representative signals utilizing said logged reference signals, and
comparing said synchronized representative signals to determine if any condition changes in the robot system have occurred between said first and second occasions.

10. An apparatus for detecting condition changes in a robot system, the apparatus comprising:
a processor configured to
receive and store logged data regarding a work cycle representative signal for the robot at a first and a second occasion,
receive and store data regarding a reference signal associated with work cycles at said first and second occasions, the data being logged synchronously with said logging of the work cycle representative signal, wherein said reference signal is a signal calculated by the robot system and influenced by a path performed by the robot, and a signal that is identical at both said occasions if a manipulator of the robot performs a movement along exactly a same path at the first and second occasions,
to synchronize said representative signals utilizing said logged reference signals, and
to compare said synchronized signals to determine if any condition changes have occurred between said first and second occasions.

11. The apparatus according to claim 10, wherein the robot system includes a path generator for generating a robot path, and said reference signal is a signal calculated by the path generator or based on one or more signals calculated by the path generator.

12. The apparatus according to claim 10, wherein the processor is part of a controller of the robot system.

13. The apparatus according to claim 10, wherein the processor is part of a device external to the robot system.

14. The method according to claim 1, wherein the processor is part of a controller of the robot system.

15. The method according to claim 1, wherein the processor is part of a device external to the robot system.

* * * * *